April 29, 1930.     C. W. EBELING     1,756,055
SYNCHRONOUS MOTOR
Original Filed Dec. 7, 1926
*Fig. 1.*
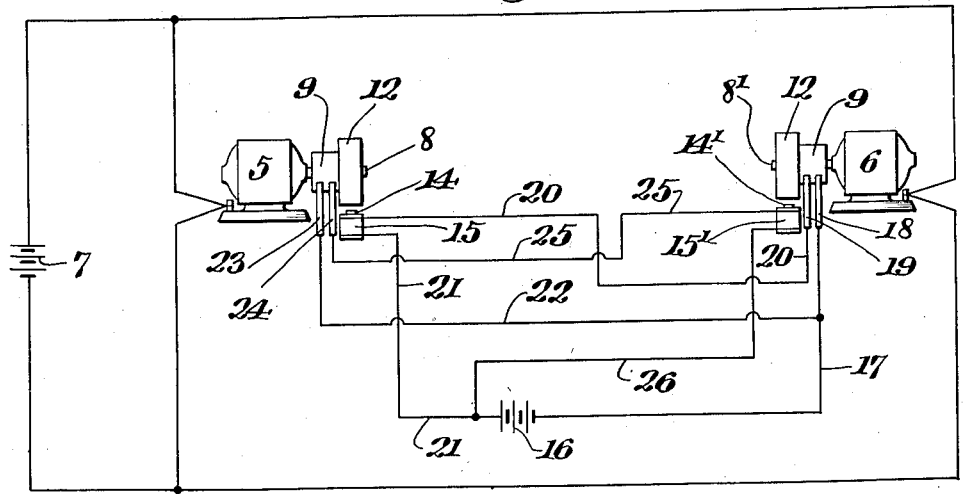
*Fig. 2.*       *Fig. 3.*
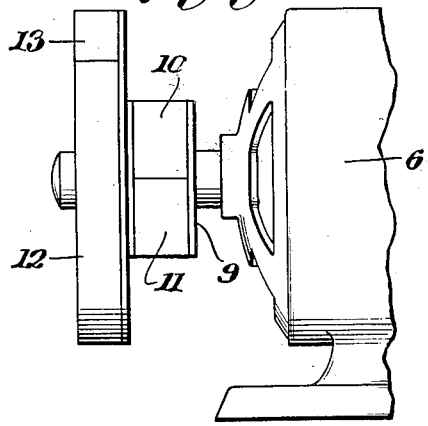 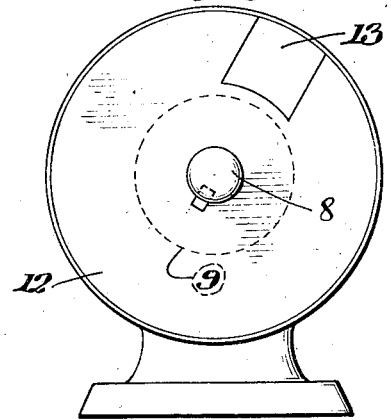
*Fig. 4.*
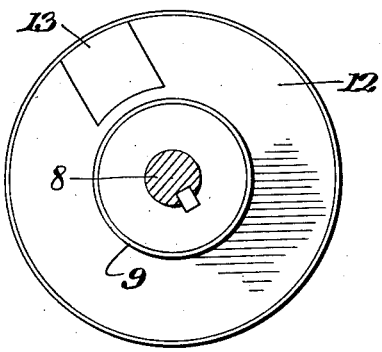
Inventor
Charles W. Ebeling
By
David Felton Moore
Attorney Patented Apr. 29, 1930

1,756,055

UNITED STATES PATENT OFFICE

CHARLES W. EBELING, OF NEW YORK, N. Y., ASSIGNOR TO HARRISON W. ROGERS, INC., A CORPORATION OF NEW YORK

SYNCHRONOUS MOTOR

Application filed December 7, 1926, Serial No. 153,079. Renewed March 4, 1930.

This invention relates to a method and apparatus for synchronizing or keeping in step two or more motors of the same phase and operated from the same source of electrical energy, one object of the invention being the provision of a novel means connected to each motor and operable or influenced from or by the next motor whereby the motors are kept in step, one by the other.

A further object of this invention is the provision of an extremely silent and efficient means attachable to the shaft of an electric motor for producing this effect and therefore rendering the motors particularly efficient for use in the operation of moving picture cameras and sound recording machines and for moving picture projectors and sound reproducing machines, it being desirable in each instance that the machines be maintained in synchrony and with the least possible noise.

In the accompanying drawings

Figure 1 is a diagrammatic view showing two motors with the attachments placed thereon and one form of electrical circuit.

Figure 2 is a side elevation of one end of a motor showing the rotor members of the present invention.

Figure 3 is a view in elevation of the compensating discs.

Figure 4 is a view taken from the opposite side.

Referring to the drawings the numerals 5 and 6 designate the respective electric motors which are of a similar type and construction and wound for identical speeds and current. The numeral 7 designates the current source for operating the motors which are connected in parallel thereto.

Mounted upon one end of each shaft 8—8' is a two-membered commutator 9 having the brass portion 10 and the fibre portion 11 while also connected and rotatable upon the shaft is a brass disc 12 which in this instance is provided with two diametrically opposite soft iron inserts or pieces 13. Mounted so that its core 14—14' is in attractive relation to the periphery of its respective disc 12 is the electromagnet 15—15'.

The electrical circuit for influencing the electromagnets 15—15' and consequently the respective discs 12 so as to act as a retarding means to the respective shafts 8—8' permit one shaft to catch up to the other, comprises a battery or other electrical source 16 having leading therefrom a conductor 17 to the brush 18 of the motor 6, the commutator 9, brush 19, conductor 20, the electromagnet 15, the conductor 21 back to the opposite side of the battery. This circuit causes the commutator 9 of the motor 6 to influence the disc 12 of the motor 5 while the circuit to control the motor 6 is as follows:—the battery 16, the conductors 17 and 22, the brush 23, the commutator 9 of the motor 5, the brush 24, the conductor 25, the electromagnet 15', and the conductors 26 and 21. Thus it will be seen that the commutator 9 of the motor 5 will control the electromagnet 15 which in turn influences the disc 12 of the motor 6 to hold it in step with the motor 5.

What I claim as new is:—

1. The combination with two electrical motors of similar speeds, of a commutator mounted upon the shaft of each motor, a disc mounted upon said shaft, a soft iron or magnetic insert in the periphery thereof, a pair of brushes engaging each commutator, two fixed electromagnets, one disposed externally of and to influence the periphery of its respective disc, and electrical means connected to the brushes and electric magnets whereby the brushes of one commutator influence the electromagnet of the other disc, and vice versa.

2. Two similar speed motors separated from each other and operated by the same character of electric current, a disk connected to the shaft of one motor and having a portion of its periphery magnetic, a commutator and brushes connected to the shaft of the other motor, an electromagnet adjacent the periphery of the disk and independent thereof, said magnet when energized acting upon the magnetic portion of the disk to momentarily halt the disk and motor shaft, and a circuit including a source of electrical energy, the commutator and its brushes, and the electromagnet.

3. Two similar speed motors separated from each other and operated by the same character of electric current, a disk carried by the shaft of one motor and having a portion of its periphery magnetic, an electromagnet adjacent said periphery and in the path of the magnetic portion thereof, a switch controlled by the other motor, and a circuit including a source of electrical energy, the switch and the electromagnet, and through which circuit the switch operating motor controls the speed of the disk operating motor.

4. Two similar speed motors disposed in spaced relation to each other and electrically operated by an electric current having the same characteristics, two disks, one connected to the shaft of each motor and each disk having a portion of its periphery composed of magnetic metal, two commutators and two pairs of brushes, one commutator and one pair of brushes operable with each disk by the motor, two electromagnets, one associated with the periphery of each disk, and two electrical circuits including a source of electrical energy connected to both circuits, and each remaining branch of said circuits including the brushes and one commutator of one motor and the electromagnet adjacent the other motor, whereby the commutator and pair of brushes of one motor will affect the peripheral speed of the other motor and vice versa.

In testimony whereof I affix my signature.

CHARLES W. EBELING.